United States Patent
Liu et al.

(10) Patent No.: US 10,013,177 B2
(45) Date of Patent: Jul. 3, 2018

(54) LOW WRITE AMPLIFICATION IN SOLID STATE DRIVE

(71) Applicant: HEWLETT PACKARD ENTERPRISE DEVELOPMENT LP, Houston, TX (US)

(72) Inventors: Chun Liu, San Jose, CA (US); Umesh Maheshwari, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/130,792

(22) Filed: Apr. 15, 2016

(65) Prior Publication Data
US 2016/0306552 A1  Oct. 20, 2016

Related U.S. Application Data

(60) Provisional application No. 62/149,827, filed on Apr. 20, 2015.

(51) Int. Cl.
G06F 3/06 (2006.01)

(52) U.S. Cl.
CPC ............ *G06F 3/061* (2013.01); *G06F 3/0656* (2013.01); *G06F 3/0679* (2013.01); *G06F 3/0688* (2013.01)

(58) Field of Classification Search
CPC ...... G06F 3/061; G06F 3/0656; G06F 3/0679; G06F 3/0688; G06F 12/0246
See application file for complete search history.

(56) References Cited

U.S. PATENT DOCUMENTS

| | | | | |
|---|---|---|---|---|
| 2004/0083335 | A1* | 4/2004 | Gonzalez | G06F 12/0246 711/103 |
| 2012/0159050 | A1* | 6/2012 | Yano | G06F 13/1668 711/103 |
| 2012/0278541 | A1* | 11/2012 | Yamaki | G06F 12/0246 711/103 |
| 2015/0074337 | A1* | 3/2015 | Jo | G06F 12/0246 711/103 |
| 2016/0283116 | A1* | 9/2016 | Ramalingam | G06F 3/0602 |

* cited by examiner

*Primary Examiner* — Edward J Dudek, Jr.

(57) ABSTRACT

Methods, systems, and computer programs are presented for storing data in a solid state drive (SSD). One method includes an operation for detecting a plurality of streams writing to the SSD, each stream writing in sectors, a page including a plurality of sectors and a block including a plurality of pages. A write operation includes writing at least one complete page, and an erase operation includes erasing at least one complete block. The method further includes operations for allocating a write buffer for each stream in RAM memory, and for storing each received sector of a stream in the corresponding write buffer. When a write buffer stores enough sectors to fill a page, content of the write buffer is written to a page in flash memory such that the page is filled. Further, the write buffer is freed after writing the content of the write buffer to the flash memory.

17 Claims, 9 Drawing Sheets

LOW WRITE AMPLIFICATION IN SOLID STATE DRIVE

CLAIM OF PRIORITY

This application claims priority from U.S. Provisional Patent Application No. 62/149,827, filed Apr. 20, 2015, and entitled "Low Write Amplification in Solid State Drive." This provisional application is herein incorporated by reference.

BACKGROUND

1. Field of the Invention

The present embodiments relates to methods, systems, and programs for improving performance of a Solid State Drive (SSD).

2. Description of the Related Art

A Solid State Drive (SSD) utilizes an erase-once, program-once, and read-multiple-times usage model. This means that there are no in-place overwrites in the SSD. Further, in NAND cells, the minimal erase size is a block, and any valid data in a block that is being erased has to be copied to a new location during garbage collection so that the block can be recycled and reused. This means that, in an SSD, a single user write can result in multiple writes on the physical device, a phenomenon known as write amplification.

Write amplification causes degradation in the performance of the SSD due to the additional write operations. What is needed is an SSD that reduces write amplification to improve the life of the SSD.

It is in this context that embodiments arise.

SUMMARY

Methods, devices, systems, and computer programs are presented for storing data in a solid state drive (SSD). It should be appreciated that the present embodiments can be implemented in numerous ways, such as a method, an apparatus, a system, a device, or a computer program on a computer readable medium. Several embodiments are described below.

One general aspect includes a method for storing data in a solid state drive (SSD), the method includes an operation for detecting a plurality of streams writing to the SSD, where each stream writes data to the SSD in sectors, and where a page includes a plurality of sectors and a block includes a plurality of pages. A write operation to SSD flash memory includes writing at least one complete page, and an erase operation in the SSD flash memory includes erasing at least one complete block. The method also includes allocating a write buffer for each stream in ram memory of the SSD, and storing each received sector of a stream in the write buffer of the stream. When a write buffer stores enough sectors to fill a page, the content of the write buffer is written to a page in flash memory such that the page is filled. The method also includes freeing the write buffer after writing the content of the write buffer to the flash memory.

One general aspect includes a solid state drive (SSD) including: a read only memory ram including a computer program having program instructions, a flash storage area for storing data, and a processor for executing the computer program. The flash storage includes a plurality of blocks, each block including a plurality of pages. A write operation to SSD flash memory includes writing at least one complete page, and an erase operation in the SSD flash memory includes erasing at least one complete block. The processor detects a plurality of streams writing to the SSD, where each stream writes data to the SSD in sectors, where a page includes a plurality of sectors, and the processor allocates a write buffer for each stream in ram memory of the SSD. The processor stores each received sector of a stream in the write buffer of the stream, and when a write buffer stores enough sectors to fill a page, the processor writes content of the write buffer to a page in flash memory such that the page is filled. Further, the processor frees the write buffer after writing the content of the write buffer to the flash memory.

One general aspect includes a non-transitory computer-readable storage medium storing a computer program for storing data in a solid state drive (SSD). The computer-readable storage medium includes program instructions for detecting a plurality of streams writing to the SSD, where each stream writes data to the SSD in sectors, where a page includes a plurality of sectors and a block includes a plurality of pages. A write operation to SSD flash memory includes writing at least one complete page, and an erase operation in the SSD flash memory includes erasing at least one complete block. The storage medium also includes program instructions for allocating a write buffer for each stream in ram memory of the SSD, and program instructions for storing each received sector of a stream in the write buffer of the stream. When a write buffer stores enough sectors to fill a page, content of the write buffer is written to a page in flash memory such that the page is filled. The storage medium further includes program instructions for freeing the write buffer after writing the content of the write buffer to the flash memory.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

In one embodiment, an SSD includes a buffer area for buffering incoming sectors in order to reduce write amplification. For each stream that sends data to the SSD, a mapping area is allocated in RAM memory for buffering the incoming sectors of that stream. The SSD has a program unit (PU) (e.g., a page), and when the buffer for a given stream is filled up to at least the size of the PU, then the data in the buffer is written to the flash memory. This way, the data written to the page in flash memory fills up the page completely and the page holds data of just one stream.

There are three benefits in reducing write amplification. First, since the total number of writes for the lifetime of the SSD is fixed to an upper limit, reducing the write amplification increases the life of the drive. Second, since the total write bandwidth is also fixed on the SSD, reducing write amplification also improves the write bandwidth. Third, it reduces the memory required to support a large number of streams.

The following embodiments describe methods, devices, systems, and computer programs for improving the performance of a Solid State Drive (SSD) by reducing write amplification. It will be apparent, that the present embodiments may be practiced without some or all of these specific details. In other instances, well-known process operations have not been described in detail in order not to unnecessarily obscure the present embodiments.

Figure 1:
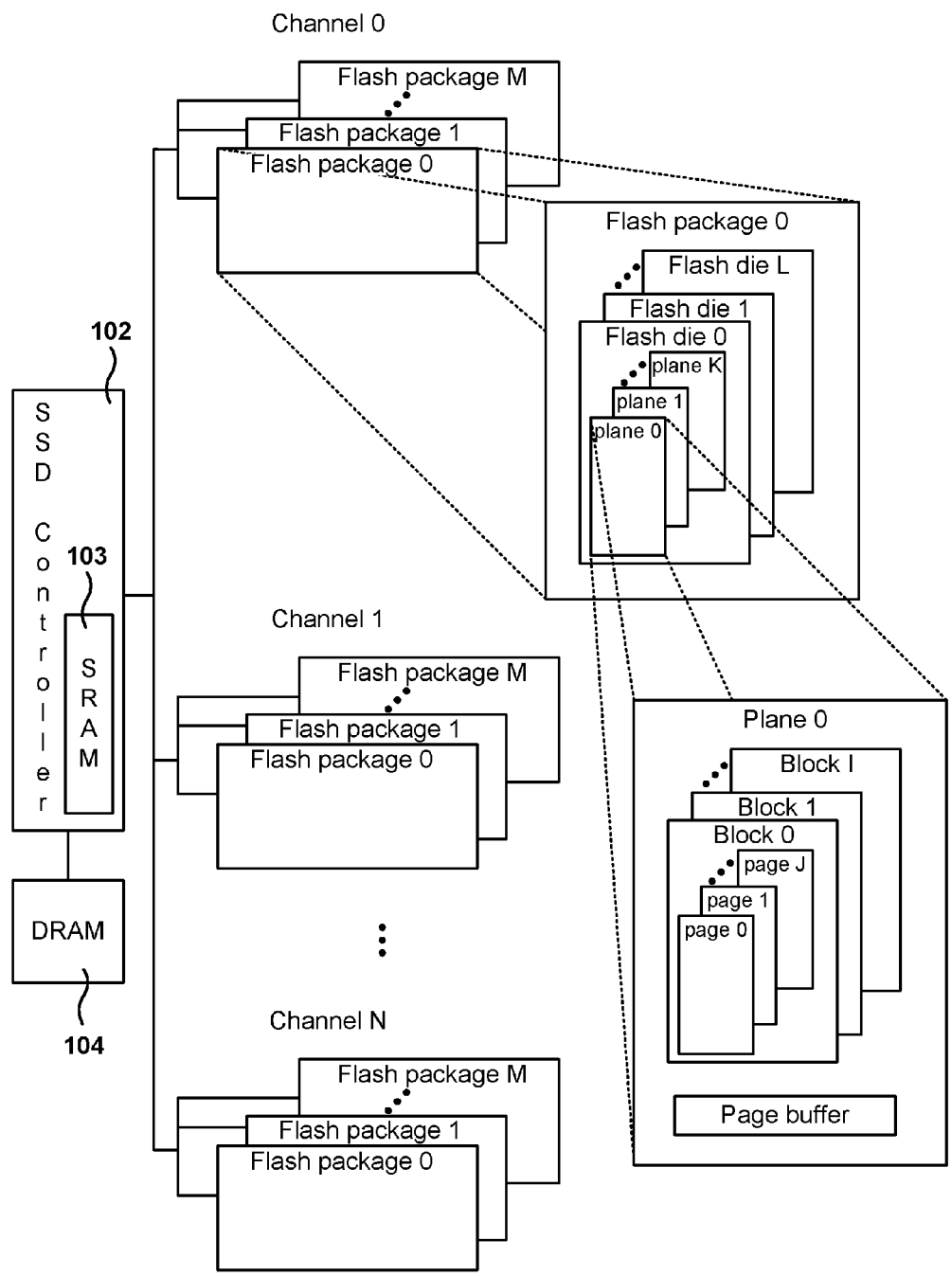
FIG. 1 illustrates the architecture of a solid state drive (SSD) memory, according to one embodiment.

FIG. 1 illustrates the architecture of a solid state drive (SSD) memory, according to one embodiment. In one embodiment, an SSD includes multiple channels with each channel having one or multiple flash chips.

In some embodiments, the SSD includes an SSD controller 102 and a plurality of channels. Each channel includes a plurality of flash packages and each flash package includes a plurality of flash dies. Further, each flash die includes a plurality of planes, where each plane includes a plurality of blocks and a page buffer. Each block includes a plurality of pages, and each page includes a plurality of flash cells. In one embodiment, the SSD includes N channels, and each channel has M of flash packages. Within each flash package, there are L dies, and in each die there are K planes. Each flash plane has I flash blocks, and each flash block has J pages.

In some embodiments, each flash cell for storing data is a floating gate transistor that can be programmed with one from a number of n voltage levels. In some embodiments, the value of n may be 2 for SLC flash, 4 for MLC flash, 8 for TLC flash, but other values of n are also possible. In the case of SLC, each flash cell represents one bit of storage, and once data is written in the cell, the data can be read any number of times, but to overwrite the data, the flash cell needs to be erased first, and then the cells can be programmed with new data.

Flash cells can be packaged as NOR cells or as NAND cells. With NOR, data can be addressed with a granularity of bytes and more transistors are needed to achieve this byte-level granularity, making NOR cells expensive. With NAND cells, the cells are organized into pages, where each flash page can be individually read and written to. Nowadays, flash page sizes can be from about 2 KBytes to 16 KBytes depending on the flash vendor and the model, but other values are also possible.

In some flash chips, the size of the flash block is in the range from about 128 Bytes to 2 MBytes, although other values are also possible. In some implementations, the flash block (also referred to as the erase unit) is the unit for erasing data, and the flash page (also referred to as the program unit) is the unit for reading and writing data.

From the life-cycle point of view, once a page is written, the page can be read any number of times, but to re-write the data in the page, the whole block where the page resides needs to be erased first, and this is why the block is referred to as the erase unit.

Each plane can take a command to read or write a flash page and is operated independently of other flash planes. When the plane takes a read command, the plane reads the flash page into its local page buffer, and the data is transferred from this local page buffer to the SSD controller using the channel bus. It is noted that the channel bus is shared by all the flash packages. Each flash plane can also take a command to erase a flash block.

Figure 2:
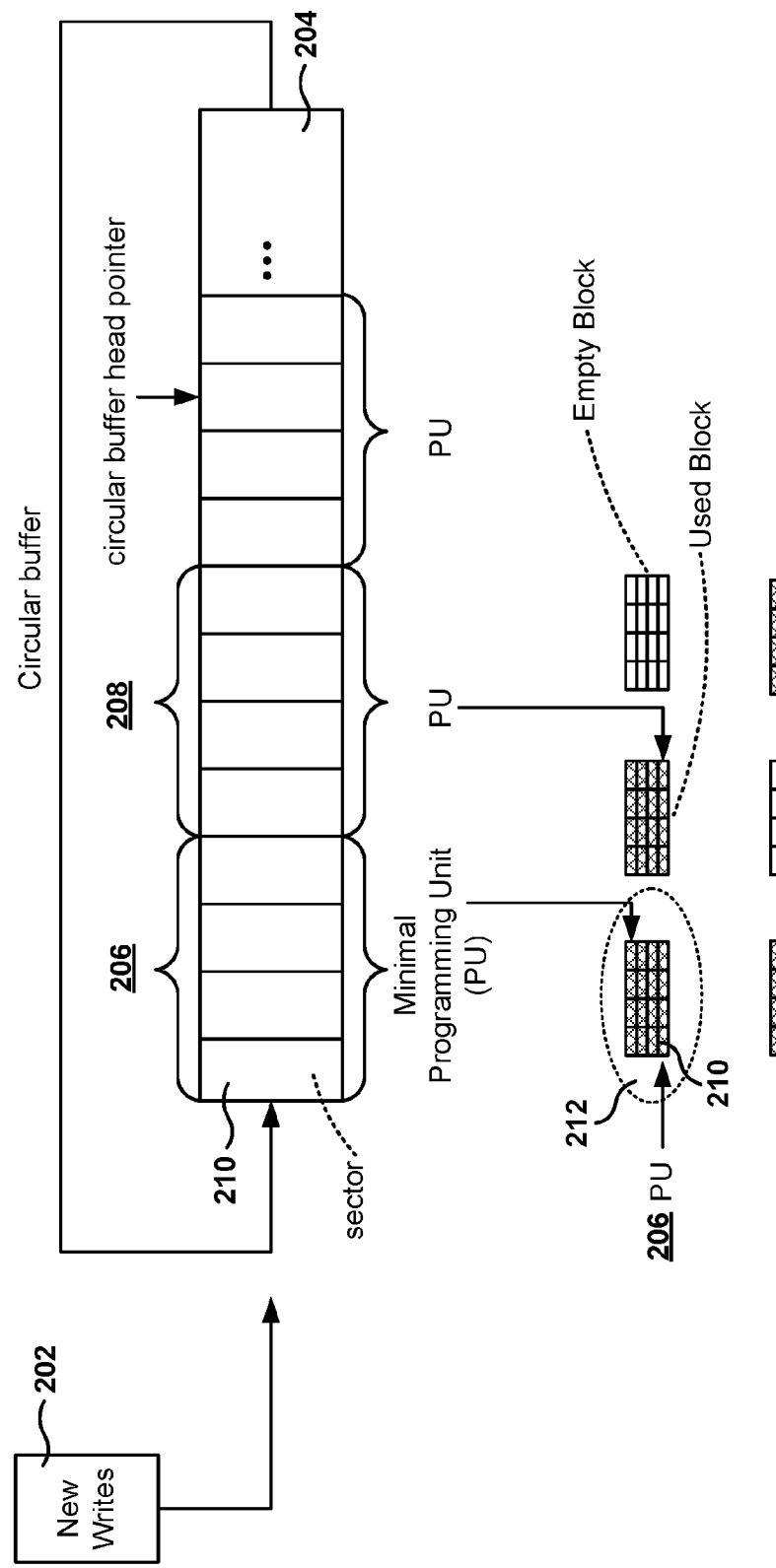
FIG. 2 illustrates the processing of incoming writes, according to one embodiment.

FIG. 2 illustrates the processing of incoming writes, according to one embodiment. An erase unit (EU) is a block of data that is erasable in a single erase operation in the SSD. The erase unit is the minimum amount of data erased in an erase operation. Further, the page unit (PU) 206, also referred to as a program unit or simply as a page, is the smallest amount of data that can be programmed (i.e., written) into the SSD in one operation. The page unit is usually much smaller than the erase unit. For example, in some embodiments the EU may be in the order of megabytes, and the program unit is in the order of kilobytes or tens of kilobytes. In some embodiments, the SSD may advertise externally a smaller PU than the one supported internally, but the SSD buffers blocks of data internally to form the PUs before they are written to the page.

As used herein, a chunk is a contiguous block of data in the volume of a predetermined size. The volume may be divided into chunks of equal size, where the chunk is a contiguous extent in the logical address space that is written sequentially by an application. The chunk is also referred to as a logical block. For example, if the chunk size is 1 MB, the application could be writing a chunk at some address, which is a multiple of 1 MB, and the application can keep writing that chunk until the whole chunk has been written. However, there could be multiple chunks being written in parallel by the application.

In some embodiments, a stream is defined for each chunk, and the application could be writing several chunks concurrently, which means that the application could be writing several streams concurrently. The stream is a logical concept, and each stream includes the data of write operations for a chunk. Thus, the chunk is predefined, and inferred, between the SSD and the device writing data to the SSD.

For example, the application could be a video service or a music service and the application may be writing multiple movies or music files concurrently (e.g., 1000 songs at the same time).

Further, a sector 210 is the minimal write unit for an application, and L2P is the flash translation layer mapping table, which maps a logical block address (LBA) to a physical address (Flash Address).

Returning now to FIG. 2, as a new write/sector 202 arrives at the SSD, the sector is placed in a circular buffer 204 defined for the corresponding stream, as described in more detail below with reference to FIG. 3. When there are enough sectors to form a programming unit (e.g., 206, 208), a programming operation in the SSD is performed to write the PU to a page inside a block 212. Some of the blocks in the SSD may be completely empty, full, or partially full. As used herein, an open block is a block with at least one free page.

Some of the existing solutions attempt to reduce write amplification by reducing the mapping unit size, which means reducing the unit size from block level mapping to hybrid mapping to page level mapping. In other solutions, the cold data is separated from the hot data, and the least frequently accessed data, or the overwritten data, is not kept in memory as long as the hot data (data that is accessed or written more often).

Figure 3:
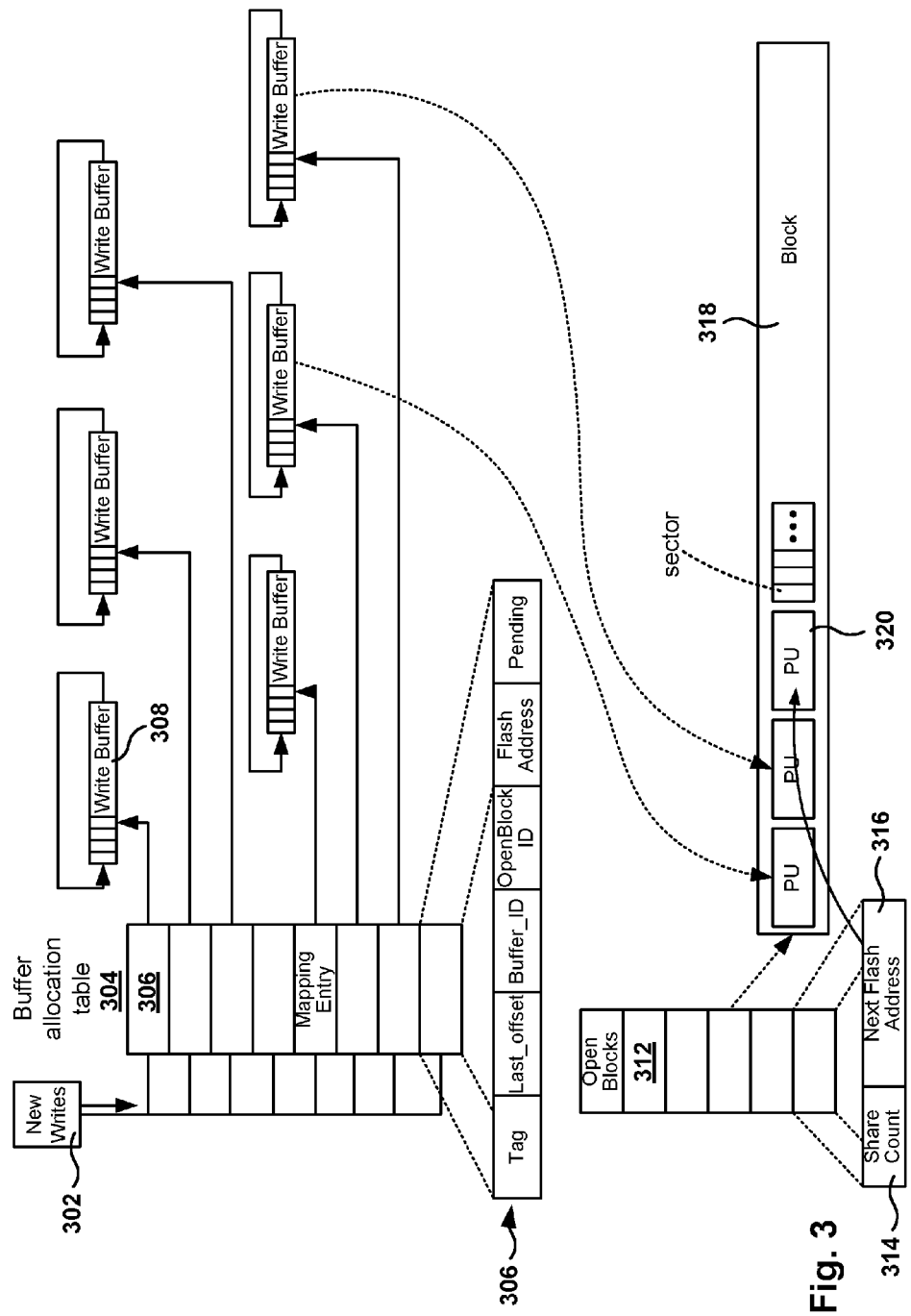
FIG. 3 illustrates a method for reducing write amplification by aligning chunk boundaries with erase units, according to one embodiment.

FIG. 3 illustrates a method for reducing write amplification by aligning chunk boundaries with erase units (e.g., blocks), according to one embodiment. Embodiments are defined to reduce write amplification by focusing on a particular type of application, which is an application that writes in large chunks. For example, the application could be a file system for a network storage device.

Supporting a large number of streams means that, at some point, the application may be writing a large number of chunks concurrently, and each chunk (i.e., stream) may be relatively large. The proposed embodiments address the following goals: 1) support large number of independent write streams (e.g., thousands of streams); 2) reduce write amplification so that write bandwidth and longevity are improved; and 3) reduce the memory consumption required to support a large number of streams.

In one embodiment, the number of streams supported by the SSD is equal to the number of chunks that may be written concurrently to the SSD. The application writes in chunks, and the application could be writing multiple chunks in parallel in an interleaved manner. It is an objective to reduce write amplification in the SSD for applications that write in large chunks. Also, one of the goals is to reduce the amount of RAM required within the SSD controller to support a large number of streams.

The goal is to fill a block with the data from a single chunk. For example, if the block size is 2 MB and the chunk size is 10 MB, then the application could write one full chunk followed by the next chunk, etc., up until 5 blocks are filled with the data from one chunk.

However, the problem is that if the storage device interfacing with the SSD waits for the whole chunk to be received from a host before writing the chunk to the SSD, the storage device would have to buffer a large amount of data because the storage device would have to buffer the whole chunk, for all the chunks concurrently being written. This is why it is desired to pass-through the data from the storage device to the SSD instead of buffering the data, to let the SSD handle the buffering of the chunk data, because the SSD is able to organize the data and do partial write operations instead of having to write the whole chunk as an atomic operation.

However, the flip side of doing data pass-through is that there may be a little bit of data for one stream, and a little bit of data for another stream, etc., and in the extreme case, that amount of data can be as small as a sector size. This would require a lot of buffering space in the SSD because the SSD would have to buffer a lot of streams simultaneously. In one embodiment, the number of possible concurrent streams is limited by the SSD in order to solve this problem.

In general, the application may not be writing all the chunks at once, but writing the chunks in interleaved fashion, and a large number of chunks may be written concurrently. There could be some data for one chunk, some data for another chunk, etc., all the data being interleaved among the different chunks.

In one embodiment, the logical address space of the volume (e.g., application) is divided into chunks of equal size, and application writes to the SSD are aligned to chunk boundaries at predefined LBAs. The chunks are not overwritten between erases, and the chunks do not overlap in memory.

A first function Tag(LBA) is defined as the logical block address (LBA) divided by the logical block size (LBA/ logical block size) and the result is referred to as the LBA tag or simply the tag. A second function Offset(LBA) is defined as (LBA % (logical block size)), where the % operator is the module operator, and the result is referred to as the offset, which represents the offset for the sector within a chunk defined by the tag. That is, all the sectors of the chunk have the same tag and their offset represents the order within the chunk.

A buffer allocation table 304, also referred to as CONEXT_TABLE, is defined in the SSD with n mapping entries 306. Each mapping entry 306 is associated with a write buffer 308 for storing in RAM memory sequential incoming blocks of an array. The write buffers 308 can be implemented in SRAM 103 in the SSD controller 102 and/or in DRAM 104 outside SSD controller 102. Each write buffer 308 is a circular buffer, as described above with reference to FIG. 2. In one embodiment, the size of the write buffer 308 is equal to the page unit size, but other embodiments may have larger write buffers.

Each mapping entry 306 includes a tag that identifies the chunk, a last offset corresponding to the last written sector in the circular buffer, the buffer ID for the corresponding write butter, an Openblock ID, a flash address where the chunk is being written, and a pending bit to track the LBA affinity. In one embodiment, if the application utilizes more than n streams, extra streams are combined as one stream to prevent entry overrun. The Openblock ID is used to identify an entry in the Open Blocks table 312, and is used to identify the block in flash memory where the pages are being written.

In one embodiment, the write buffer is divided into units corresponding to the sector size. Each write buffer has (PU size/sector size) entries reserved to store partial page data. This enables the support of a large number of streams with limited memory usage.

In one embodiment, there are three threads executing in the SSD for processing incoming writes: the buffer-allocation thread, the flash-program thread, and the program-done thread. The buffer-allocation thread takes an incoming $LBA_x$ as the input and searches the n entries in the buffer allocation table 304 to check for a mapping entry whose LBA tag matches the $Tag(LBA_x)$. If such entry is found, the thread verifies if the $Offset(LBA_x)$ is equal to the Last_Offset+1. If both conditions are met, the incoming sector is moved to the corresponding buffer for that entry at $Offset(LBA_x)/(PU\ size/sector\ size)$, and Last_Offset is incremented by 1. In one embodiment, if an entry for the tag is found but the Offset $(LBA_x)$ does not match the Last_Offset+1, then the incoming sector is moved to a reserved entry for random traffic.

If the entry is not found and $Offset(LBA_x)$ is 0, it means that the starting sector of a chunk has been received, and a new write buffer $Buffer\_ID_y$ is allocated, as well as a new chunk and a new Openblock ID $Chunk_z$. $Chunk_z$ is associated with a block $B_x$. An empty mapping entry is allocated and initialized with the parameters [$Tag(LBA_x)$, 0, Buffer-$\_ID_y$, $Chunk_z$, $B_x$, 0]. The incoming sector is moved to the offset 0 of the reserved buffer $Buffer\_ID_y$.

If the number of input streams exceeds the number of open blocks, multiple chunks are put into a single block, thus the OpenBlockID is reused between input streams. The thread finds a stream that is less shared than a predetermined sharing threshold. If the entry is not found and $Offset(LBA_x)$ is not 0, then the incoming sector is moved to a reserved entry for random traffic.

In all cases, L2P is updated to reflect that the new data is placed in the partial PU buffer 308, thus any read operation will forward the data from the partial PU buffer. Further, a check is made to determine if a block is exhausted, in which case that block can be closed and an entry in the buffer allocation table 304 freed. In one embodiment, the system makes sure that at least one entry is always empty. Otherwise, the data is blocked until an entry becomes available. This serves as a back-pressure mechanism.

The flash-program thread searches the mapping entries and checks the number of valid sectors in the write buffer for that entry. If there is more than, or equal to, the PU size and the entry's pending bit is not set, the PU 320 from the write buffer is selected for transfer to a block 318 in flash memory.

The open blocks table 312 includes entries associated with open blocks in flash (e.g., blocks that are not completely filled and have at least one empty page). Each open blocks table entry identifies the share count 314 of how many PUs have been written to the block, and the next flash address 316 identifying the address for writing the next PU in the block.

When writing a page to the block, the flash-program thread checks the open block table 312 to determine the flash address to program to. After writing the page, the next flash address value is increased by 1 to point to the next PU in the EU. If all PUs are used in the EU, then the corresponding entry in the open block table is updated with the address of an available open block. The controller sends a program command to the proper flash address, and sets the pending bit for that entry. By utilizing the open block table, the system can multiplex multiple input streams into a single block, e.g., multiple chunks into a single block.

If the flash programming is successful, the L2P entry is updated to reflect the persistent address on flash and to recycle the buffer for remaining sectors in a chunk. If a chunk is successfully written, the mapping entry is marked as empty and made available for new streams. If input-stream multiplexing is used, and all chunks are written, the Openblock ID is recycled. If the programming is not successful, the block is marked as bad, a EU is allocated, the entry's physical address is reset to the new EU (block number), and the PU is set to 0.

The net effect of such operations is that the data is bucketed by its spatial locality, and transferred to a natural flash block (e.g., erase unit) as a whole. Thus, when the LB s are stale, the LB s will incur minimal write amplification. Due to the employment of partial PU buffers, the memory consumption is minimized for the bucketed data buffer.

Thus, each mapping entry 306 is associated with a different stream. It is expected that an application is able to write data larger than one PU (e.g., 16 kB). For example, each unit in the buffer could be one sector (e.g., 4 kB). The application is expected to write many of those program units, all the way up to a chunk. But buffering the whole chunk is undesirable because a lot of buffering space would be required. Only one page is buffered for each stream at a time, because once a complete page is received, the page is sent to a block, making room in the buffer for receiving more pages. Therefore, each stream requires buffering the size of one page or programming unit.

The chunk has multiple pages, and each page has multiple sectors. Therefore, when data is received, it is necessary to have (chunk number, page address, page offset). That is, it is necessary to know the chunk, the page within the chunk, and offset within the page to write the data. The SSD organizes the data, putting the data together for the chunks.

In today's solutions, the SSD acts as a blender because the SSD blends data together from many sources. The goal of the embodiments presented herein is to separate the data within the SSD for the different streams, i.e., the SSD acts as a separator.

If the SSD had all the buffering memory to buffer all chunks for all supported streams, the SSD would require a lot of buffering memory (e.g., 10 GB). By buffering the data as described above, the SSD is able to support a large number of streams without requiring that much buffering space. In addition, by organizing the data this way, garbage collection does not have to be run as often.

Figure 4:
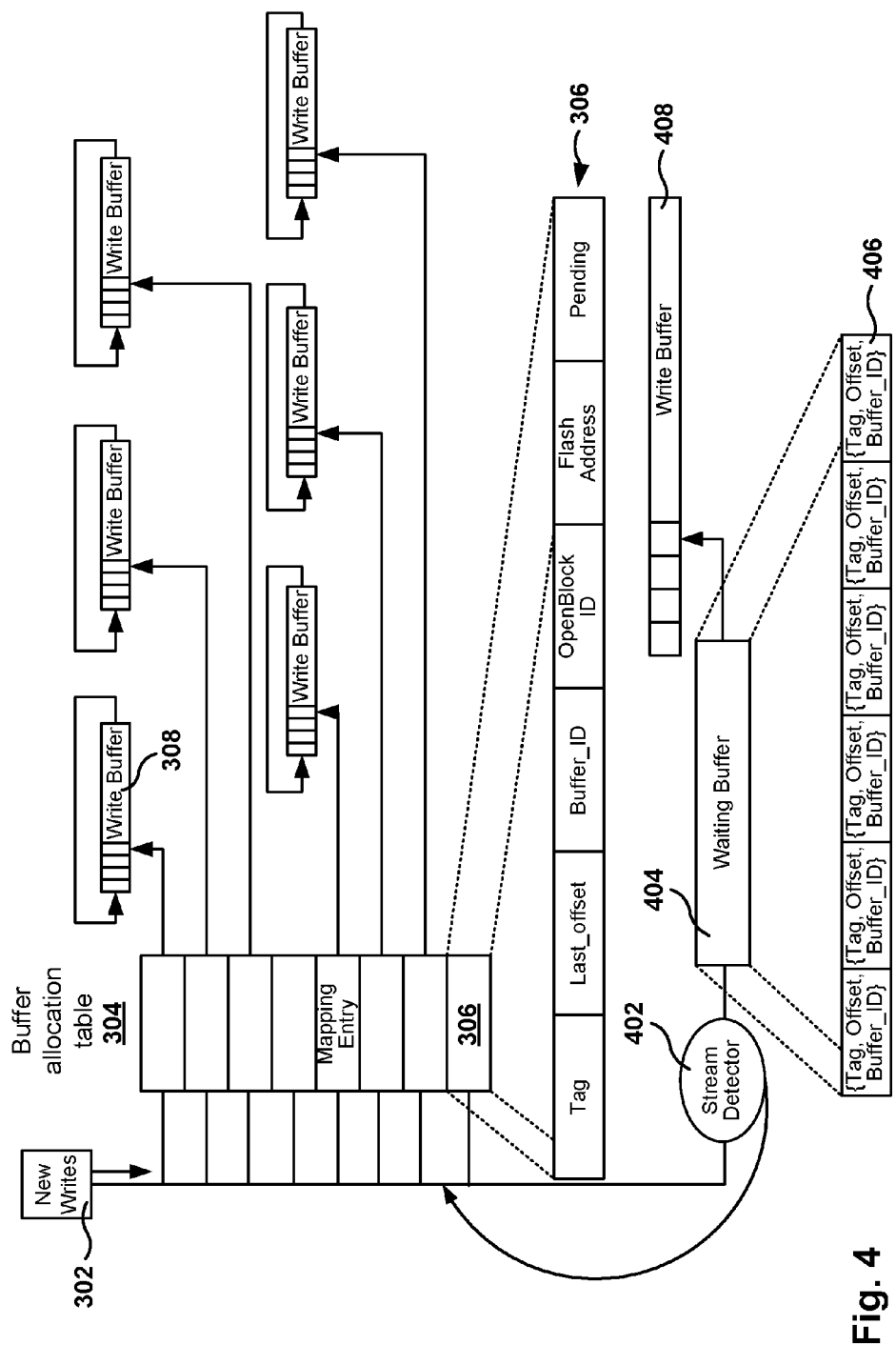
FIG. 4 illustrates a method for reducing write amplification with jitter control, according to one embodiment.

FIG. 4 illustrates a method for reducing write amplification with jitter control, according to one embodiment. In one embodiment, the operating system of the host or the storage device may reorder write requests. This can make detecting the stream challenging, as the first request received at the SSD may not begin with an Offset($LBA_x$) at 0. In one embodiment, a different stream-detection method is utilized for such environments.

In one embodiment, a waiting buffer 404 is used to identify streams, and a sliding-window approach is utilized in each stream to accommodate jitter within the stream. The waiting buffer 404 temporarily stores writes until a stream can be identified for the writes. Each entry 406 in the waiting buffer includes the LBA tag, the LBA Offset, and the buffer ID where the write is temporarily stored.

In one embodiment, a stream is determined to be identified when the LBA offsets of two entries in the waiting buffer are apart less than a predetermined amount (e.g., 16 PUs). Thus, when a new write comes in, stream detector 402 checks to determine if the new write can be assigned to an existing stream in the buffer allocation table 304, by checking if the LBA tag and the LBA Offset of the new write belongs to an identified stream.

If the entry matches an existing stream, the offset of the new write is checked against the stream's Offset_Last_Window to see whether the offset is less than (Offset_Last_Window+Sliding_Window_Width). If it is exactly Offset_Last_Window+1, the Offset_Last_Window is incremented to "slide the window forward." Otherwise, a bitmap, indicating how many entries have been received in the sliding window, is updated.

If the new write is not part of an existing stream, the new write is checked against all the entries in the waiting buffer to see whether an existing entry has the same LBA tag. If there is existing entry in the waiting buffer with the same LBA tag, and the offsets of both entries offsets are apart less than a predetermined threshold (e.g., the width of the sliding window Sliding_Window_Width), a new stream is identified. Both entries are removed from the waiting buffer and allocated to a new stream entry in the buffer allocation table 304. Otherwise, the new received write is stored into the waiting buffer.

In one embodiment, the waiting buffer is a first-in first-out (FIFO) queue of fixed size, and overflow entries are placed into a stream reserved for random traffic. All other operations are the same as in the method described above with reference to FIG. 3.

It is noted that the embodiments illustrated in FIGS. 3-4 are exemplary. Other embodiments may utilize different data structures, include more or less space for buffering, etc. The embodiments illustrated in FIGS. 3-4 should therefore not be interpreted to be exclusive or limiting, but rather exemplary or illustrative.

Figure 5:
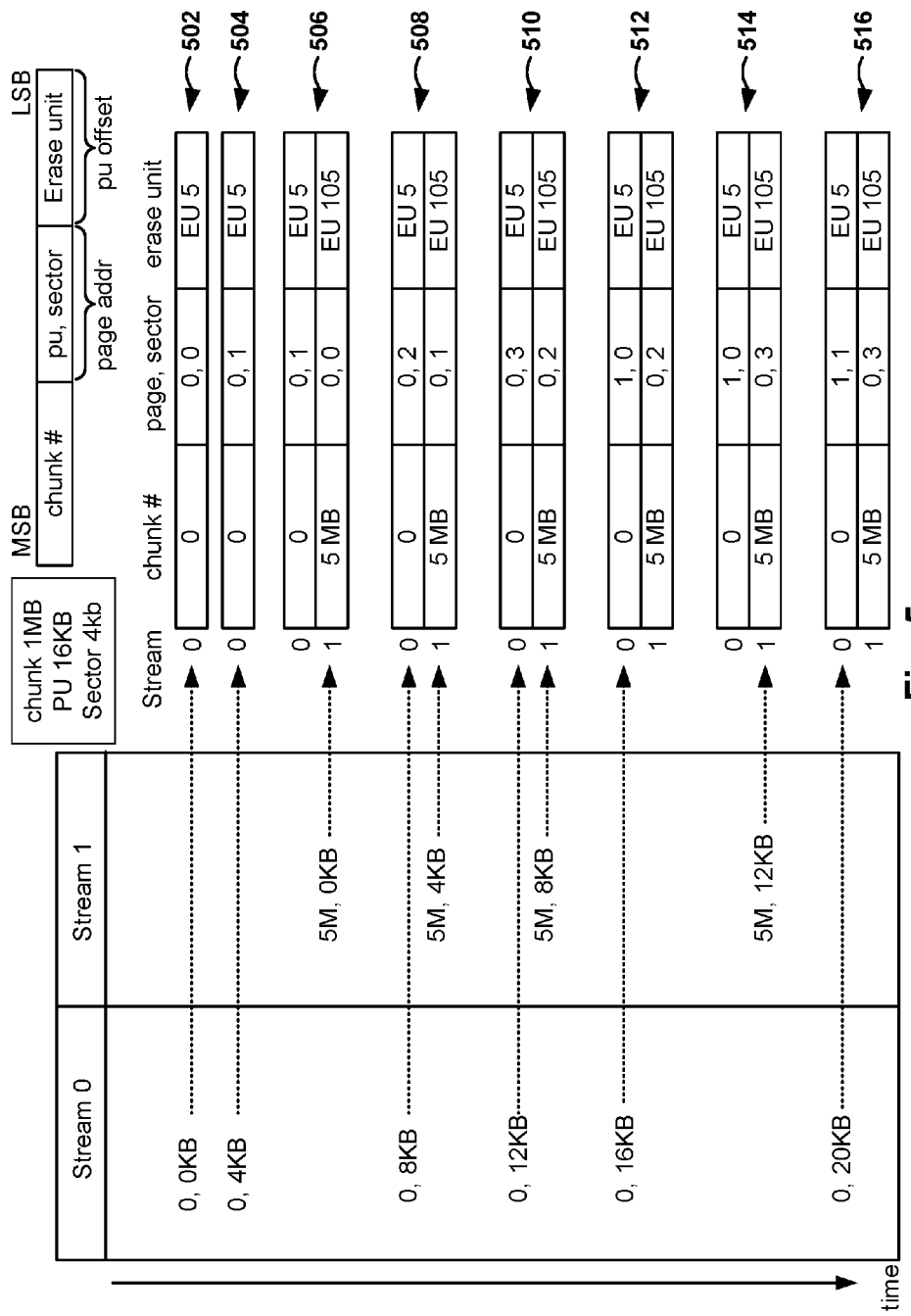
FIG. 5 illustrates an example for buffering incoming page units, according to one embodiment.

FIG. 5 illustrates an example for buffering incoming pages, according to one embodiment. In the exemplary embodiment of FIG. 5, there are two streams active, and for both streams the chunk size is 1 MB, the PU size is 16 kB, and the sector size is 4 kB. Therefore, there are 4 sectors in one page.

The first stream (Stream 0) has a chunk number of 0 (e.g., a tag of 0), and the second stream (Stream 1) a chunk number of 5M (e.g., a tag of 5 MB). The application sends the data in blocks of 4 kB corresponding to the sector size. Thus, the amount of buffering needed in the SSD for these two streams is 32 kB, calculated as the PU size of 16 kB times the number of streams supported (2).

It is noted that there is no advantage in choosing a chunk size that is bigger than the erase unit size. In one embodiment, it is assumed that the chunk size is equal to the erase unit size. In FIG. 5, the last column on the right corresponds to the erase unit (e.g., block) associated with the respective stream (e.g., chunk): EU 5 and EU 105.

Once a complete PU is received, the PU is written to the flash memory in the corresponding EU. As discussed above, the data for the stream does not have to be buffered all the way up to the chunk size, only buffered up to the page unit size until the complete page is received.

As discussed above, detecting the stream is simple: when a write is received, the tag is examined. If it is the tag for one of the current streams, the write is put in its place in the write buffer. If an entry is not found, then a new stream is identified and a new buffer is allocated. Further, if an entry is not found and the offset is not zero, then it is assumed that it is a random write, and the write is placed in a reserved space for handling random writes.

When a PU is full, the PU is sent to memory and marked as pending, which means that the PU is being programmed into the flash. After the PU is written successfully, then the corresponding buffer is not pending any longer and the buffer can be reused. If the write is not successful, then a new erase unit is found to write the PU.

When the new write size is bigger than the PU size, an optimization can be employed to bypass the write buffer in DRAM 104 to improve bandwidth. The optimization will move the new writes directly into SRAM in the SSD controller to program the corresponding page in the EU.

Initially, the first stream sends a sector for chunk 0 at offset 0, which is represented as a pair of values (chunk, offset in chunk) or (0,0) for the first chunk. For simplification purposes, an entry is defined for each stream in the mapping table, and the entry includes [chunk number, a pair of values representing page and sector, erase unit]. Therefore, the first sector of stream 0 creates entry 502 with values [0, 0, 0, EU 5] for chunk 0, page 0, sector 0, and erase unit EU 5.

Afterwards, the second write is received for stream 0 at offset 4 KB. Entry 502 is updated to entry 504 [0, 0, 1, EU5] reflecting that sector 1 has been received.

Then the first sector for stream 1 is received at the chunk starting at 5 MB and 0 KB offset. A new entry is created for stream 1 in table 506, with values [5 MB, 0, 0, EU 105]. After a third sector is received in stream 0, and a second sector is received for stream 1, the mapping table 508 now includes the entries [0, 0, 2, EU 5] and [5 MB, 0, 1, EU 105].

Then the next sequential sector is received in each stream, and the mapping table 510 now has values [0, 0, 3, EU 5] and [5 MB, 0, 2, EU 105]. It is noted that stream 0 has now received four sectors, enough to form a complete page. Therefore, the page unit is written to the correspondent block, as described above.

Afterwards, a new sector is received in stream 0, which is then stored in page 1. Therefore, the mapping table 512 now has values [0, 1, 0, EU 5] and [5 MB, 0, 2, EU 105]. After the next sector is received for stream 1, the mapping table 514 now has values [0, 1, 0, EU 5] and [5 MB, 0, 3, EU 105]. Stream 1 has now received four sectors, enough to form a complete page. Therefore, the page unit is written to the correspondent erase unit, as described above. The process continues, and when a new sector is received for stream 0, the mapping table 516 is updated to [0, 1, 1, EU 5] and [5 MB, 0, 3, EU 105].

Figure 6A:
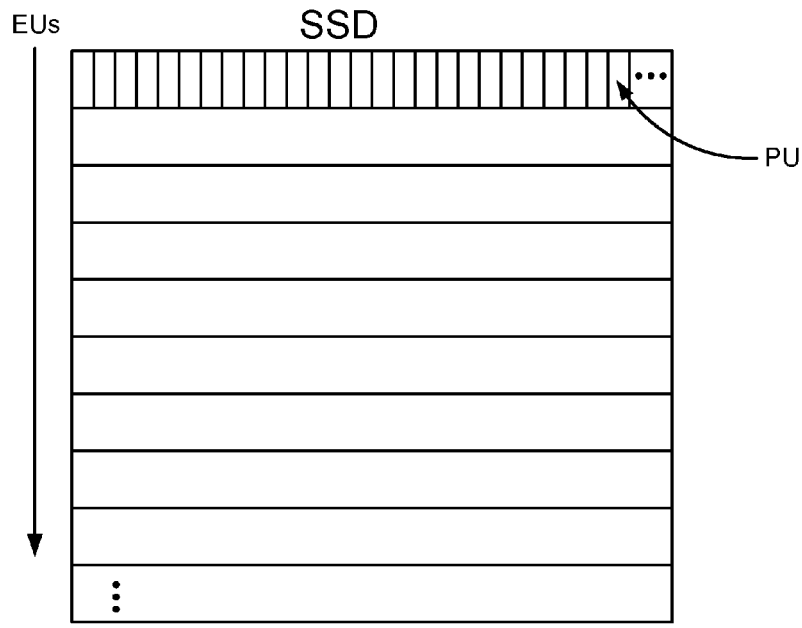
FIGS. 6A-6B illustrate the alignment of chunks with the erase units, according to one embodiment.
Figure 6B:
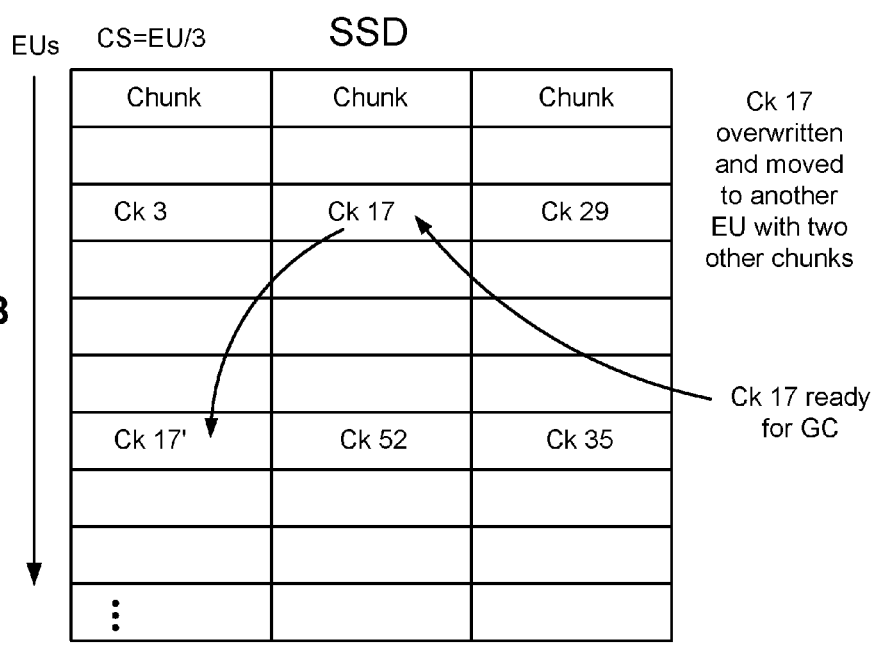

FIGS. 6A-6B illustrate the alignment of chunks with the erase units or blocks, according to one embodiment. FIG. 6A illustrates a representation of the flash storage as an array of erase units, and within each erase unit there is a plurality of page units or programmable units.

Therefore, each stream (e.g., chunk) is lined up within the erase unit boundaries, which means that each chunk takes one erase unit when the chunk size is equal to the erase unit size. If the chunk size is an integer multiple of the erase unit size, then each chunk takes a plurality of erase units.

FIG. 6B illustrates the scenario where the chunk size is a divisor of the erase unit size. This means that the erase unit size is k times the chunk size, where k is a small integer. Write amplification can also be reduced for this case.

The erase unit is subdivided into a plurality of k chunks. In the exemplary embodiment of FIG. 6B, the erase unit is three times the chunk size, therefore, each erase unit holds three chunks. The difference is that when a chunk already in memory is overwritten, the chunk is rewritten into a different erase unit with two other chunks.

For example, if one erase unit includes chunks 3, 17, and 29, if chunk 17 is being overwritten, then chunk 17 is written into another erase unit, together with two other chunks (e.g., chunks 52 and 35). The first erase unit that originally had chunk 17 now has one third of space ready for garbage collection, while the other two thirds of the erase unit have valid data.

Eventually, some erase units will have the three chunks overwritten, or deleted, and then the whole erase unit will have no valid data, being ready for garbage collection, or reprogramming. If k is small and the number of erase units is large, then probabilistically there will be some erase units that are completely garbage. This helps reduce write amplification, because there is less copy forward of chunks. A copy forward of a chunk takes place when the chunk has valid data but the erase unit is being garbage collected, then the chunk needs to be copied forward to another erase unit. In general, garbage collection is performed on erase units that are complete garbage or that have the most amount of garbage space.

In one embodiment, the SSD is designed for over provisioning. Each SSD has an advertised size, but some SSD's over provision by setting aside some spare space, which is not advertised, to increase the chance of finding free erase units during garbage collection. That is, there are some spare erase units. For example, the flash drive could advertise 1 TB of data but internally have 1.25 TB of data. This improves garbage collection because it increases the chances of finding free erase units, or erase units with a large amount of free space.

Figure 7A:
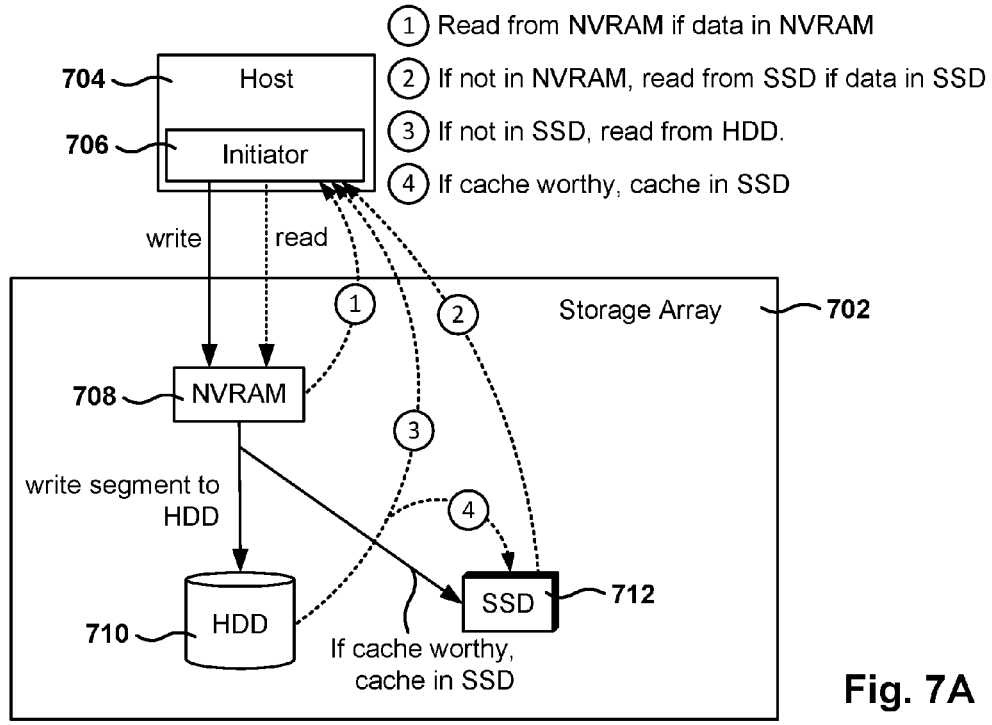
FIGS. 7A-7B illustrate the read and write paths within the storage array, according to several embodiments.
Figure 7B:
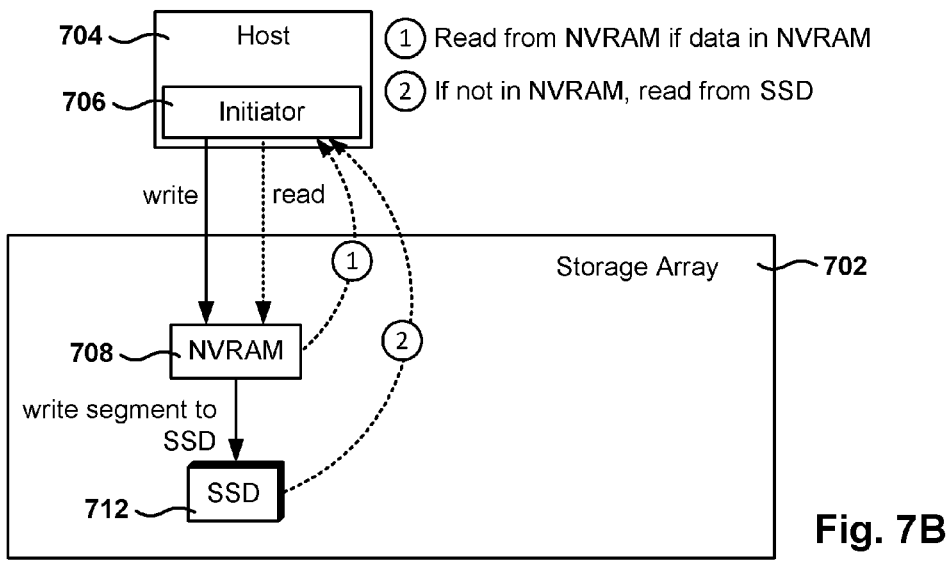

FIGS. 7A-7B illustrate the read and write paths within the storage array, according to several embodiments. FIG. 7A shows the write path for a hybrid system with SSDs and HDDs, where the initiator 706 in the host 704 sends the write request to the storage array 702. As the write data comes in, the write data is written into NVRAM 708, and an acknowledgment is sent back to the initiator (e.g., the host or application making the request). In one embodiment, storage array 702 supports variable block sizes. Data blocks in the NVRAM 708 are grouped together to form a segment that includes a plurality of data blocks, which may be of different sizes. The segment is compressed and then written to HDD 710. In addition, if the segment is considered to be cacheworthy (i.e., important enough to be cached or likely to be accessed again) the segment is also written to the solid state drive (SSD) cache 712. In one embodiment, the segment is written to the SSD 712 in parallel while writing the segment to HDD 710.

In one embodiment, the performance of the write path is driven by the flushing of NVRAM 708 to disk 710. With regards to the read path, the initiator 706 sends a read request to storage array 702. The requested data may be found in any of the different levels of storage mediums of the storage array 702. First, a check is made to see if the data is found in RAM (not shown), which is a shadow memory of NVRAM 708, and if the data is found in RAM then the data is read from RAM and sent back to the initiator 706. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 712 and sent to the initiator 706. If the data is not found in the NVRAM 708 nor in the flash cache 712, then the data is read from the hard drives 710 and sent to the initiator 706. In addition, if the data being served from hard disk 710 is cache worthy, then the data is also cached in the SSD cache 712.

FIG. 7B illustrates the read and write paths for an all-flash array having SSDs for permanent storage and no HDDs. The write path includes writing the incoming data to NVRAM 708 and later saving the data in SSD 712. The read path is also simplified as compared to the hybrid system of FIG. 7A, where the data is read from NVRAM 708 if available in NVRAM, and if the data is not found in NVRAM 708 then the data is read from SSD 712.

Figure 8:
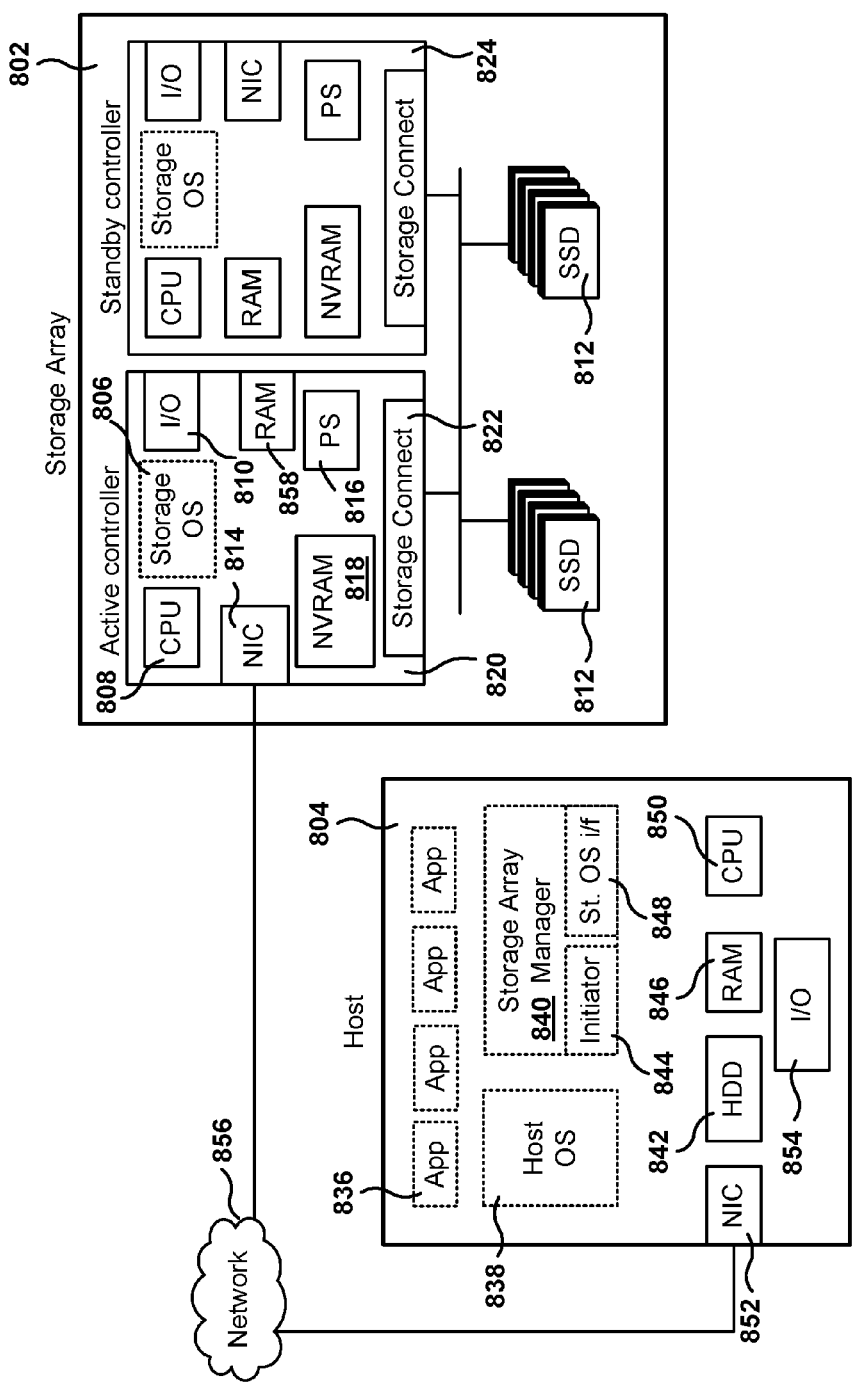
FIG. 8 illustrates the architecture of an all-flash storage array, according to one embodiment.

FIG. 8 illustrates the architecture of an all-flash storage array, according to one embodiment. In one embodiment, all-flash storage array 802 includes an active controller 820, a standby controller 824, and one or more SSDs 812. In one embodiment, the controller 820 includes non-volatile RAM (NVRAM) 818, which is for storing the incoming data as the data arrives to the storage array. After the data is processed (e.g., compressed and organized in segments (e.g., coalesced)), the data is transferred from the NVRAM 818 to SSD 812.

In addition, the active controller 820 further includes CPU 808, general-purpose RAM 812 (e.g., used by the programs executing in CPU 808), input/output module 810 for communicating with external devices (e.g., USB port, terminal port, connectors, plugs, links, etc.), one or more network interface cards (NICs) 814 for exchanging data packages through network 856, one or more power supplies 816, a temperature sensor (not shown), and a storage connect module 822 for sending and receiving data to and from SSD 812. In one embodiment, standby controller 824 includes the same components as active controller 820.

Active controller 820 is configured to execute one or more computer programs stored in RAM 858. One of the computer programs is the storage operating system (OS) used to perform operating system functions for the active controller device. In some implementations, one or more expansion shelves may be coupled to storage array 802 to increase storage capacity.

Active controller 820 and standby controller 824 have their own NVRAMs, but they share SSDs 812. The standby controller 824 receives copies of what gets stored in the NVRAM 818 of the active controller 820 and stores the copies in its own NVRAM. If the active controller 820 fails, standby controller 824 takes over the management of the storage array 802. When servers, also referred to herein as hosts, connect to the storage array 802, read/write requests (e.g., IO requests) are sent over network 856, and the storage array 802 stores the sent data or sends back the requested data to host 804.

Host 804 is a computing device including a CPU 850, memory (RAM) 846, permanent storage (HDD) 842, a NIC card 852, and an IO module 854. The host 804 includes one or more applications 836 executing on CPU 850, a host operating system 838, and a computer program storage array manager 840 that provides an interface for accessing storage array 802 to applications 836. Storage array manager 840 includes an initiator 844 and a storage OS interface program 848. When an IO operation is requested by one of the applications 836, the initiator 844 establishes a connection with storage array 802 in one of the supported formats (e.g., iSCSI, Fibre Channel, or any other protocol). The storage OS interface 848 provides console capabilities for managing the storage array 802 by communicating with the active controller 820 and the storage OS 806 executing therein.

To process the IO requests, resources from the storage array 802 are required. Some of these resources may be a bottleneck in the processing of storage requests because the resources are over utilized, or are slow, or for any other reason. In general, the CPU and the hard drives of the storage array 802 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In one embodiment, it should be understood that the "block-level processing" of SSDs 812 is different than "instruction-level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

Figure 9:
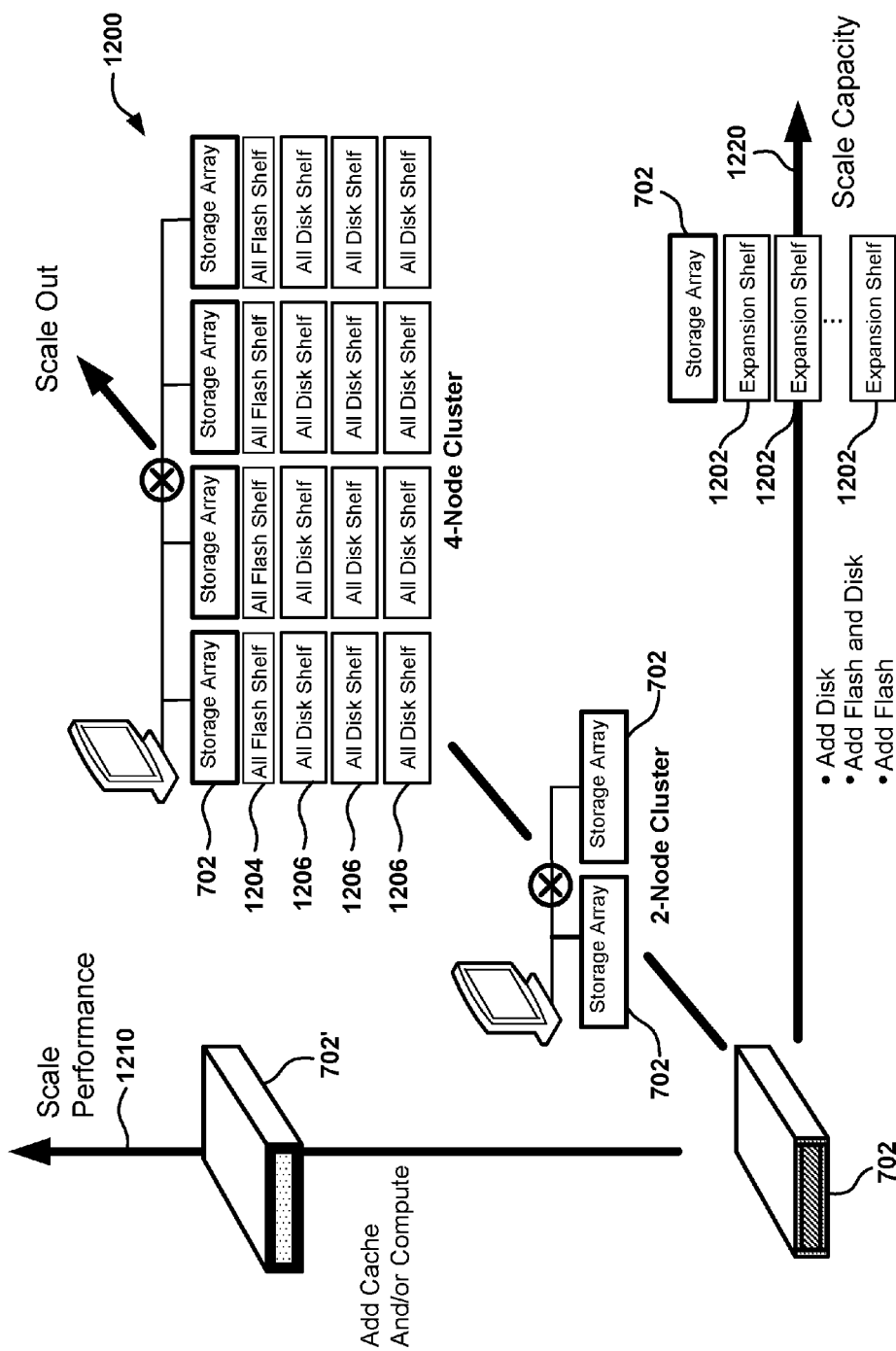
FIG. 9 is an example of the flexibility of the storage array, which can be expanded for scaling performance and for scaling capacity.

FIG. 9 is an example of the flexibility of the storage array, which can be expanded for scaling performance and for scaling capacity. In this illustration, the storage array can be adjusted to add cache and/or compute resources to define a more powerful storage array 702'. In one example, instead of upgrading the storage array 702, an upgraded storage array 702 can take its place to provide additional processing power (e.g., more powerful CPUs, higher capacity NVRAM, higher capacity DRAM, improved storage enclosure routing and buses, improved fan speeds, modified enclosure [e.g., chassis] heights [U1, U2, U3, etc.]), different power supplies, and/or other redundancy and/or memory and/or processing infrastructure.

In one embodiment, if the storage array requires additional disk or storage or flash storage memory, the storage array can be expanded to scale out by adding expansion shelves 1202 to the storage array 702. As discussed above, the expansion shelves 1202 may be defined by all-disk shelves (ADS) or all-flash shelves (AFS), or combinations of ADS and AFS shelves In a further example, the flexibility of the storage array 702 is shown by its ability to be clustered into various sizes, which take into consideration both the scaling of performance and the scaling of capacity, which is referred to herein as "scaling-out" or "scale-out" of the storage array implementation. As shown, if additional processing power is required and additional storage capacity is required, storage arrays can be clustered together, such as to define a two-node cluster. In other embodiments, if an increased level of storage is required and processing power, multiple storage arrays can be clustered together, such as in the example of a four-node cluster.

The four-node cluster is provided such that each storage array is expanded by an all flash shelf 1204 and various all-disk shelves 1206. In some embodiments, fewer all-disk shelves can be coupled to each of the arrays that are clustered together. In still other embodiments, some clustered arrays may not be included in all flash shelves but only additional one or more of all-disk shelves. Still further, some embodiments may be more symmetric such as the four-node cluster example shown in FIG. 9.

Thus, the embodiments described herein enable the scaling of capacity and performance beyond the physical limitations of a single storage array by seamlessly clustering any combination of storage hybrid arrays. An advantage of clustering is that performance can be managed to avoid capacity silos and performance hotspots, and enables easy management of all hardware resources across the cluster as a single storage entity.

In one embodiment, as mentioned above, the storage OS that executes a storage algorithm is capable of taking thousands of point-in-time instant snapshots of volumes by creating a copy of the volumes' indices. Any updates to existing data or new data written to a volume are redirected to free space. In one example implementation, no performance impact due to snapshot processing is taken, as snapshots take little incremental space when only changes are maintained. This also simplifies restoring snapshots, as no data needs to be copied.

Other embodiments are also provided, wherein some or all of the snapshots can be entirely and uniquely taken, wherein no incremental type snapshot is processed. Thus, it should be understood that a variety of implementations and modifications can be made and still enable the snapshot management to be processed by the storage OS of the storage array 702, in accordance with one or more embodiments. In another embodiment, processing by the storage OS enables efficient replication of data to another array by transferring compressed, block-level changes only. These remote copies can be made active if the primary array becomes unavailable. This makes deploying disaster data recovery easy and affordable—especially over a WAN to a remote array where bandwidth is limited.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments.

What is claimed is:

1. A method for storing data in a solid state drive (SSD), the method comprising:

detecting a plurality of streams writing to the SSD, wherein each stream of the plurality of streams writes data to the SSD in sectors, wherein a page includes a plurality of sectors, wherein a block includes a plurality of pages and has a block size, wherein a write operation to the SSD includes writing at least one page, wherein an erase operation in the SSD includes erasing at least one block;

allocating a respective write buffer for each of the plurality of streams in a random access memory (RAM), wherein a tag is defined for each of the plurality of streams, and wherein the tag for a stream is equal to a logical block address of a sector within the stream divided by the block size;

storing, for each stream of the plurality of streams, each received sector of the stream in the allocated write buffer of the stream;

in response to a write buffer storing sufficient sectors to fill a page, writing content of the write buffer to fill a page in the SSD;

freeing the write buffer after writing the content of the write buffer to the SSD;

configuring a waiting buffer in the RAM, the waiting buffer including entries of received sectors that are not associated with any of the detected plurality of streams;

detecting two sectors in the waiting buffer having a same tag;

creating a new stream for the detected two sectors; and moving the detected two sectors from the waiting buffer to the write buffer of the created new stream.

2. The method as recited in claim 1, further including:
defining a buffer allocation table in the RAM, each entry in the buffer allocation table being associated with a respective write buffer, wherein each entry in the buffer allocation table includes the tag defined for a stream, a last offset in the write buffer, a buffer ID of the write buffer, an open block ID, and an address in the SSD.

3. The method as recited in claim 2, wherein writing content of the write buffer to fill the page further includes:
finding a free page in the block identified by the open block ID; and
writing the page to the free page.

4. The method as recited in claim 1, further including:
defining an open blocks table in the RAM to store information regarding blocks having free pages.

5. The method as recited in claim 4, further including:
in response to a block mapped in the open blocks table being filled, taking the filled block off the open blocks table and creating a new entry in the open blocks table for a block with at least one empty page.

6. The method as recited in claim 1, wherein each write buffer has a size equal to a size of a page of the SSD.

7. The method as recited in claim 1, wherein the write unit is equal to a size of a page and an erase unit is equal to a size of a block.

8. A system comprising:
a memory storing a computer program having program instructions; and
a processor to execute the computer program to:
detect a plurality of streams writing to a solid state drive (SSD), wherein each stream of the plurality of streams writes data to the SSD in sectors, wherein a page includes a plurality of sectors, wherein a block includes a plurality of pages and has a block size, wherein a write operation to the SSD includes writing at least one page, wherein an erase operation in the SSD includes erasing at least one block; and
allocate a respective write buffer for each of the plurality of streams in a random access memory (RAM), wherein a tag is defined for each of the plurality of streams, and wherein the tag for a stream is equal to a logical block address of a sector within the stream divided by the block size;
store, for each stream of the plurality of streams, each received sector of the stream in the allocated write buffer of the stream; and
in response to a write buffer storing sufficient sectors to fill a page, write content of the write buffer to fill a page in the SSD;
free the write buffer after writing the content of the write buffer to the SSD;
configure a waiting buffer in the RAM, the waiting buffer including entries of received sectors that are not associated with any of the detected plurality of streams;
detect two sectors in the waiting buffer having a same tag;
creating a new stream for the detected two sectors; and
move the detected two sectors from the waiting buffer to the write buffer of the created new stream.

9. The system as recited in claim 8, wherein the processor is to execute the computer program to define a buffer allocation table in the RAM memory, each entry in the buffer allocation table being associated with a respective write buffer, wherein each entry in the buffer allocation table includes the tag defined for a stream of the plurality of streams, a last offset in the write buffer, a buffer ID of the write buffer, an open block ID, and an address in the SSD.

10. The system as recited in claim 9, wherein to write the content of the write buffer to fill the page, the processor is to execute the computer program to find a free page in the block identified by the open block ID, and write the page to the free page.

11. The system as recited in claim 9, wherein the processor is to execute the computer program to define an open blocks table in the RAM to store information regarding blocks having free pages, and in response to a block mapped in the open blocks table being filled, take the filled block off the open blocks table and to create a new entry in the open blocks table for a block with at least one empty page.

12. The system as recited in claim 8, wherein the processor is to execute the computer program to configure a waiting buffer in the RAM, the waiting buffer including entries of received sectors that are not associated with any of the detected plurality of streams.

13. A non-transitory computer-readable storage medium storing machine readable instructions that when executed by a processor cause a processor to:
detect a plurality of streams writing to a solid state drive (SSD), wherein each stream of the plurality of streams writes data to the SSD in sectors, wherein a page includes a plurality of sectors, wherein a block includes a plurality of pages and has a block size, wherein a write operation to the SSD includes writing at least one complete page, wherein an erase operation in the SSD includes erasing at least one complete block;
allocate a respective write buffer for each stream of the plurality of streams in a random access memory (RAM), wherein a tag is defined for each of the plurality of streams, and wherein the tag for a stream is equal to a logical block address of a sector within the stream divided by the block size;
store, for each stream of the plurality of streams, each received sector of the stream in the allocated write buffer of the stream;
in response to a write buffer storing sufficient sectors to fill a page, write content of the write buffer to a page in flash memory such that the page is filled;
free the write buffer after writing the content of the write buffer to the SSD;
configure a waiting buffer in the RAM, the waiting buffer including entries of received sectors that are not associated with any of the detected plurality of streams;
detect two sectors in the waiting buffer having a same tag;
create a new stream for the detected two sectors; and
move the detected two sectors from the waiting buffer to the write buffer of the created new stream.

14. The storage medium as recited in claim 13, wherein the instructions are further to cause the processor to:
define a buffer allocation table in the RAM, each entry in the buffer allocation table being associated with a respective write buffer, wherein each entry in the buffer allocation table includes the tag defined for a stream of the plurality of streams, a last offset in the write buffer, a buffer ID of the write buffer, an open block ID, and an address in the SSD.

15. The storage medium as recited in claim 14, wherein, to write the page, the instructions are further to cause the processor to:
   find a free page in the block identified by the open block ID; and
   write the page to the free page.

16. The storage medium as recited in claim 13, wherein the instructions are further to cause the processor to:
   define an open blocks table in the RAM to store information regarding blocks having free pages.

17. The storage medium as recited in claim 16, wherein the instructions are further to cause the processor to:
   in response to a block mapped in the open blocks table being filled, the processor is to take the filled block off the open blocks table and create a new entry in the open blocks table for a block with at least one empty page.

* * * * *